US008000344B1

(12) United States Patent
Frick

(10) Patent No.: US 8,000,344 B1
(45) Date of Patent: Aug. 16, 2011

(54) METHODS, SYSTEMS, AND COMPUTER PROGRAM PRODUCTS FOR TRANSMITTING AND RECEIVING LAYER 2 FRAMES ASSOCIATED WITH DIFFERENT VIRTUAL LOCAL AREA NETWORKS (VLANS) OVER A SECURE LAYER 2 BROADCAST TRANSPORT NETWORK

(75) Inventor: J. Kevin Frick, Raleigh, NC (US)

(73) Assignee: Extreme Networks, Inc., Santa Clara, CA (US)

( * ) Notice: Subject to any disclaimer, the term of this patent is extended or adjusted under 35 U.S.C. 154(b) by 1268 days.

(21) Appl. No.: 11/313,187

(22) Filed: Dec. 20, 2005

(51) Int. Cl.
H04J 3/16 (2006.01)
(52) U.S. Cl. ............... 370/466; 370/395.53; 725/15; 713/1; 713/150
(58) Field of Classification Search ........... 370/466, 370/395.53, 399; 726/14–15; 713/1; 714/5
See application file for complete search history.

(56) References Cited

U.S. PATENT DOCUMENTS

| | | | |
|---|---|---|---|
| 6,963,972 B1 * | 11/2005 | Chang et al. | 713/153 |
| 7,818,796 B2 * | 10/2010 | Volpano et al. | 726/15 |
| 2005/0278565 A1 * | 12/2005 | Frattura et al. | 714/5 |
| 2006/0129792 A1 * | 6/2006 | Bots et al. | 713/1 |
| 2006/0245438 A1 * | 11/2006 | Sajassi et al. | 370/399 |
| 2007/0110078 A1 * | 5/2007 | De Silva et al. | 370/395.53 |

OTHER PUBLICATIONS

IEEE P802.1AE/D.0 Media Access Control Security, Aug. 2005, IEEE, first edition, p. 1-147.*
R. Atkinson, IP Encapsulating Security Payload ESP, Aug. 1995.*
"Virtual Bridged Local Area Networks," IEEE 802.1Q, pp. 1-303 (2005).

* cited by examiner

Primary Examiner — Aung S Moe
Assistant Examiner — Vinncelas Louis
(74) Attorney, Agent, or Firm — Jenkins, Wilson, Taylor & Hunt, P.A.

(57) ABSTRACT

Methods, systems, and computer program products for sending and receiving frames associated with different VLANs over a secure layer 2 broadcast transport network are disclosed. According to one method, a layer 2 frame is received at a transmit port of a layer 2 forwarding device. The layer 2 frame is to be sent over a secure layer 2 broadcast transport network. A VLAN identifier corresponding to a first VLAN is extracted from the layer 2 frame. The first VLAN identifier is mapped to a second VLAN identifier used by the secure broadcast transport layer 2 network to identify the first VLAN. A portion of the layer 2 frame including the first VLAN identifier is encrypted. The layer 2 frame is transmitted over the secure layer 2 broadcast transport network with the second VLAN identifier in a cleartext portion of the frame.

21 Claims, 5 Drawing Sheets

METHODS, SYSTEMS, AND COMPUTER PROGRAM PRODUCTS FOR TRANSMITTING AND RECEIVING LAYER 2 FRAMES ASSOCIATED WITH DIFFERENT VIRTUAL LOCAL AREA NETWORKS (VLANS) OVER A SECURE LAYER 2 BROADCAST TRANSPORT NETWORK

TECHNICAL FIELD

The subject matter described herein relates to methods and systems for transmitting and receiving layer 2 frames over a secure layer 2 broadcast transport network. More particularly, the subject matter described herein relates to methods, systems, and computer program products for transmitting and receiving frames associated with different VLANs over a secure layer 2 broadcast transport network.

BACKGROUND ART

Layer 2 forwarding devices, such as Ethernet switches, typically forward packets based on layer 2 destination addresses. For example, a layer 2 forwarding device may perform a lookup in a layer 2 forwarding table based on a layer 2 destination address in a received packet or frame. If the layer 2 destination address is present in the table, the packet or frame is forwarded to the output port associated with the entry. If the destination address is not present in the forwarding table, the frame is typically flooded to all ports other than the port on which the frame was received. Similarly, when a packet is addressed to a broadcast layer 2 address, the packet is typically flooded to all output ports other than the port on which the packet was received.

IEEE standard 802.1Q specifies that a virtual local area network (VLAN) identifier may be placed in a layer 2 frame and used to limit the broadcast domain of the layer 2 frame. For example, if a layer 2 frame includes a VLAN tag and a broadcast MAC address, the layer 2 frame will only be flooded over ports of a device that are associated with the VLAN tag in the frame. Similarly, when a layer 2 frame is addressed to a non-broadcast layer 2 address, and an entry is not present for the address in the layer 2 forwarding table, the packet is only flooded over ports that are associated with the VLAN corresponding to the VLAN tag. Thus, a VLAN is one way to limit the broadcast domain of a layer 2 frame.

The IEEE 802.ae standard describes a mechanism for encrypting layer 2 frames for transmission over a layer 2 network. The standard requires that the entire frame other than the layer 2 header and some additional fields be encrypted. According to the standard, the 802.1Q VLAN tag is encrypted. Thus, when a layer 2 frame that is encrypted according to the 802.ae standard is transmitted over a broadcast network, such as a metro Ethernet, there is no visible VLAN tag for which the broadcast domain can be restricted. This can be problematic if it is desirable for different VLANs to be transmitted to different devices connected to a transport network. For example, it may be desirable to send layer 2 frames across the transport network from site A to site B, but not to site C. However, because the transport network treats all layer 2 frames as being part of the same VLAN, the frames will be flooded to site B and site C. If site B receives packets that are not destined for it, the packets will simply be discarded. However, site B must decrypt the packets and examine the 802.1Q VLAN identifiers to determine that the packets are not destined for site B.

Accordingly, in light of these difficulties associated with transmitting frames associated with different VLANs across a secure layer 2 broadcast domain, there exists a need for improved methods, systems, and computer program products for transmitting and receiving frames associated with different VLANs over a secure layer 2 broadcast transport network.

SUMMARY

According to one aspect, the subject matter described herein includes a method for transmitting frames associated with different VLANs over a secure layer 2 broadcast transport network. As used herein, the term "secure layer 2 broadcast network" refers to a network where frames are propagated based on layer 2 destination addresses and where at least a portion of each frame is encrypted. The method may include receiving, at a transmit port of a layer 2 forwarding device, a layer 2 frame to be sent over a secure layer 2 broadcast network. A VLAN identifier corresponding to a first VLAN is extracted from the layer 2 frame. The first VLAN identifier is mapped to a second VLAN identifier used by the secure layer 2 broadcast transport network to identify the first VLAN. A portion of the layer 2 frame, including the first VLAN identifier, is encrypted. The layer 2 frame is transmitted over the secure layer 2 broadcast transport network with a second VLAN identifier being in a cleartext portion of the of the layer 2 frame.

According to another aspect, the subject matter described herein includes a method for processing packets received from a secure layer 2 broadcast transport network. The method includes receiving an encrypted layer 2 frame with a service VLAN identifier. It is determined whether the service VLAN identifier maps to a local VLAN identifier. If the service VLAN identifier maps to a local VLAN identifier, the service VLAN identifier may be removed from the layer 2 frame, and the encrypted portion of the layer 2 frame may be decrypted. The decrypted portion may include a VLAN identifier inserted by the sending site. The VLAN identifier inserted by the sending site may be overwritten with the local VLAN identifier. The layer 2 frame may then be forwarded based on the layer 2 destination address and the local VLAN identifier. If the service VLAN identifier does not map to a local VLAN identifier, the layer 2 frame may be dropped without decrypting the frame.

The methods, systems, and computer program products described herein for transmitting and receiving frames associated with different VLANs over a secure layer 2 broadcast transport network may be implemented using hardware, software, firmware, or any combination thereof. In one exemplary implementation, the subject matter described herein may be implemented using a computer program product comprising computer executable instructions embodied in a computer readable medium. Exemplary computer readable media suitable for implementing the subject matter described herein include disk memory devices, chip memory devices, programmable logic devices, and application specific integrated circuits. In addition, a computer program product that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION OF THE INVENTION

Figure 1:
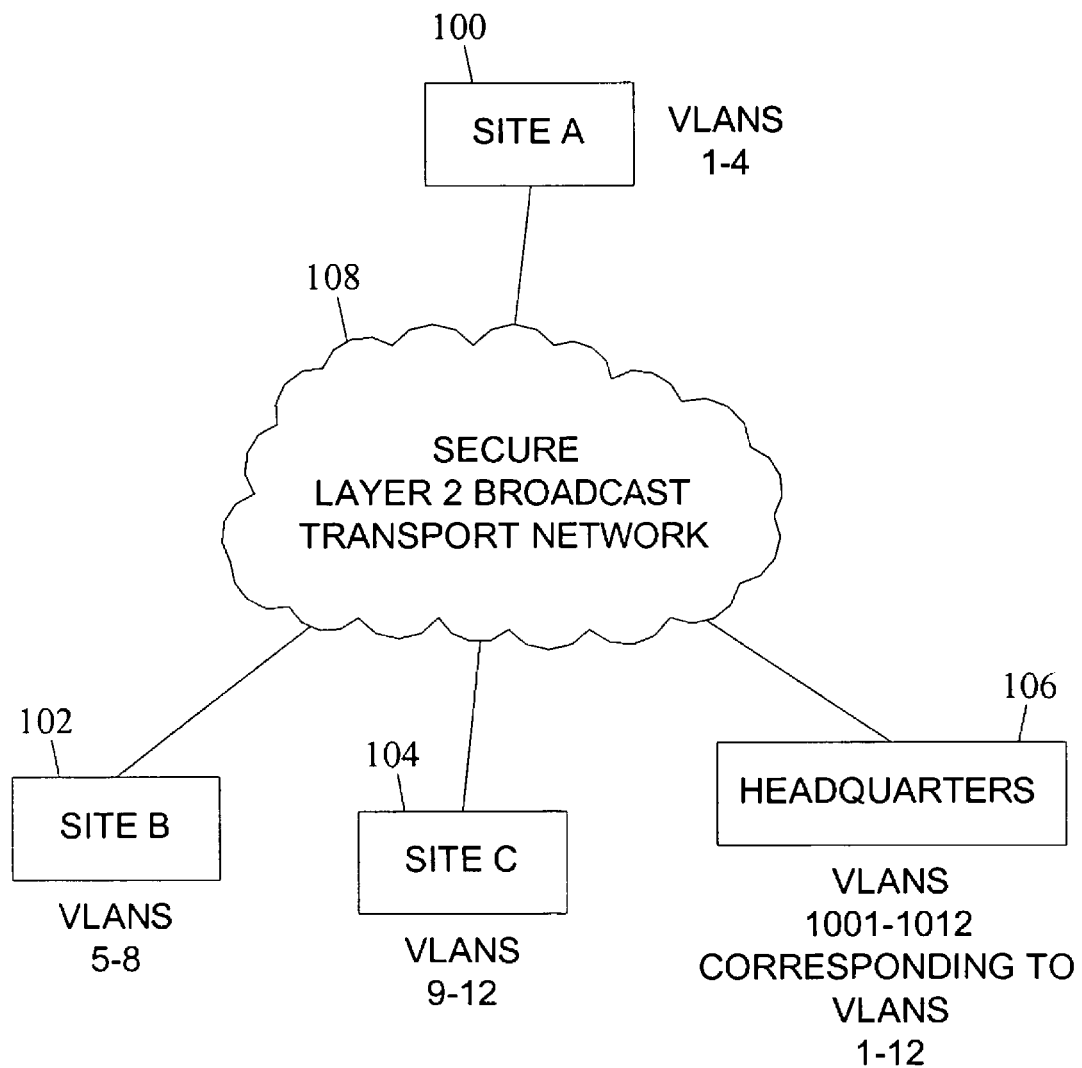
FIG. 1 is a block diagram illustrating an exemplary operating environment for embodiments of the subject matter described herein.

FIG. 1 is a block diagram illustrating an exemplary operating environment for embodiments of the subject matter described herein. Referring to FIG. 1, a company may have geographically separate sites connected via a secure layer 2 broadcast transport network. In the illustrated example, the company includes site A 100, site B 102, site C 104, and headquarters 106. Each of these sites may include computers that are connected to a layer 2 network and a switch that connects each company's layer 2 network to the other sites via secure layer 2 broadcast transport network 108. For simplicity of illustration, the individual computers and switches are not shown in FIG. 1. Secure layer 2 broadcast transport network 108 may be an 802.ae network where the 802.1Q VLAN identifier is encrypted.

Each of sites A-C 100-104 and headquarters 106 may be customer sites, and secure layer 2 broadcast transport network 108 may be a service network that provides secure transport service between the customer sites. As such, VLAN identifiers used by sites A-C 100-104 and headquarters 106 to identify local VLANs are referred to herein as customer VLAN identifiers. Similarly, VLAN identifiers used by secure layer 2 broadcast network 108 to identify VLANs are referred to as service VLAN identifiers.

Although the terms "service VLAN" and "customer VLAN" are used in the examples described herein, the subject matter described herein is not intended to be limited to networks where a service network under the administrative domain of a service provider provides secure layer 2 transport service for customer networks under the administrative domain of one or more customers separate from the service provider. The service network and the one or more customer networks may be under different administrative domains or under a common administrative domain without departing from the scope of the subject matter described herein.

In the illustrated example, site A 100 may use VLAN IDs 1-4 to send layer 2 frames to headquarters 106. Similarly, site B 102 may use VLAN IDs 5-8 to send layer 2 frames to headquarters 106. Site C 104 may use VLAN IDs 9-12 to send layer 2 frames to headquarters 106. Headquarters 106 may use VLAN IDs 1001-1012 to identify local VLANs corresponding to VLANs 1-12. VLAN IDs 1-12 and 1001-1012 are thus customer VLAN IDs because they identify customer VLANs 1-12. If secure layer 2 broadcast transport network 108 did not use 802.ae encryption, site A 100 could limit the broadcast domain of transmitted frames to computers at headquarters 106 by inserting a VLAN tag of 1 in the frames and transmitting the frames across secure layer 2 broadcast transport network 108. Each layer 2 forwarding device in secure layer 2 broadcast transport network 108 would be configured to transport the frames only on output ports associated with VLAN 1. The frames would eventually make it to headquarters 106 and be forwarded over VLAN 1001. Sites B and C 102 and 104 would not receive the frames. However, because secure layer 2 broadcast transport network 108 uses encryption, secure layer 2 broadcast transport network 108 would not see the VLAN identifier 1 in the layer 2 frames from site A 100. Accordingly, without the subject matter described herein, frames addressed to VLAN 1 would be flooded over all output ports of switches within secure layer 2 broadcast transport network 108. As a result, sites B and C 102 and 104 would receive frames addressed to VLAN 1 and would unnecessarily be required to decrypt the frames in order to determine whether or not to discard the frames.

In order to avoid this difficulty, one aspect of the subject matter described herein includes inserting a service VLAN identifier in a cleartext portion of layer 2 frames before the frames are transmitted over secure layer 2 broadcast transport network 108. The service VLAN identifier corresponds to a VLAN that secure layer 2 broadcast transport network associates with the encrypted VLAN identifier.

Figure 2:
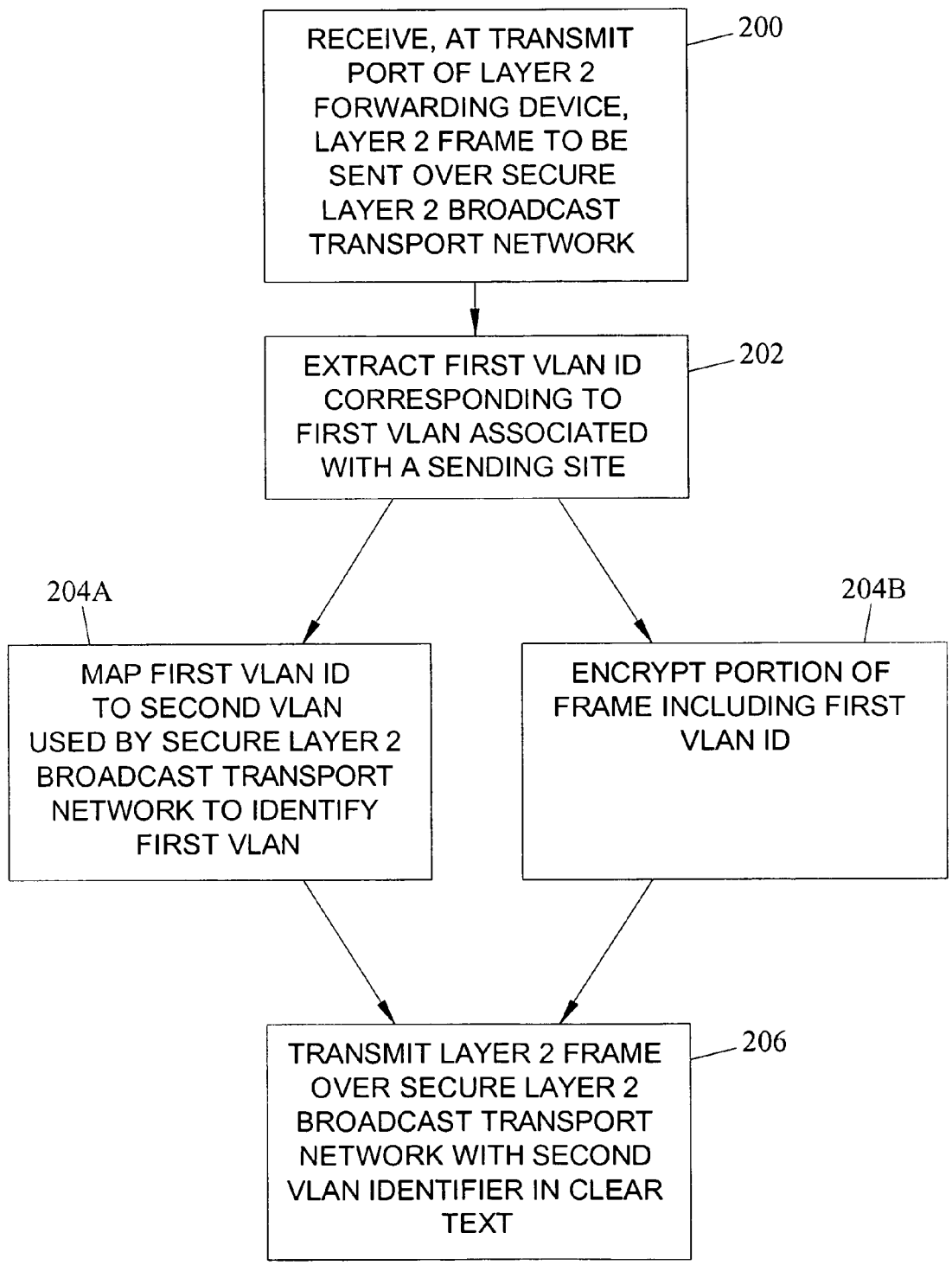
FIG. 2 is a flow chart illustrating an exemplary process for forwarding a layer 2 frame over a secure layer 2 broadcast transport network according to an embodiment of the subject matter described herein.

FIG. 2 is a flow chart illustrating exemplary steps for processing a layer 2 frame to be transmitted over a secure layer 2 broadcast transport network according to an embodiment of the subject matter described herein. The steps illustrated in FIG. 2 may be performed by a layer 2 frame forwarding device located at the edge of a service network, such as secure layer 2 broadcast network 108. The layer 2 frame forwarding device may be under the administrative domain of the service network or the customer network, if the service network and the customer network are under different administrative domains.

Referring to FIG. 2, in step 200, a layer 2 frame is received at a transmit port of a layer 2 forwarding device. The layer 2 frame is to be sent over a layer 2 broadcast transport network. For example, the port over which the layer 2 frame may be transmitted may be connected to a broadcast Ethernet network, such as a metro Ethernet that implements 802.*ae* encryption. In step 202, a first VLAN identifier is extracted from the layer 2 frame. The first VLAN identifier may be the 802.1Q VLAN identifier inserted by a sending customer site to identify a first customer VLAN. Alternatively, the first VLAN identifier may be an identifier inserted by a switch downstream from the sending customer site that identifies the first customer VLAN. In step 204A, the first VLAN identifier is mapped to a second VLAN identifier used by the secure layer 2 broadcast transport network to identify the first VLAN. In an embodiment in which the secure layer 2 broadcast transport network is a service network for a plurality of customer networks, the second VLAN identifier may be a service VLAN identifier that the service network associates with the sending customer VLAN. In step 204B, a portion of the frame including the first VLAN identifier is encrypted. Steps 204A and 204B may be performed concurrently by different hardware and/or software. Alternatively, step 204A may be performed before step 204B. In yet another alternative, step 204B may be performed before step 204A. What is important is that the second VLAN identifier, e.g., the service VLAN identifier, is not encrypted in the frame. In step 206, the layer 2 frame is transmitted over the secure layer 2 broadcast transport network with the service VLAN identifier in a cleartext portion of the frame.

Figure 3:
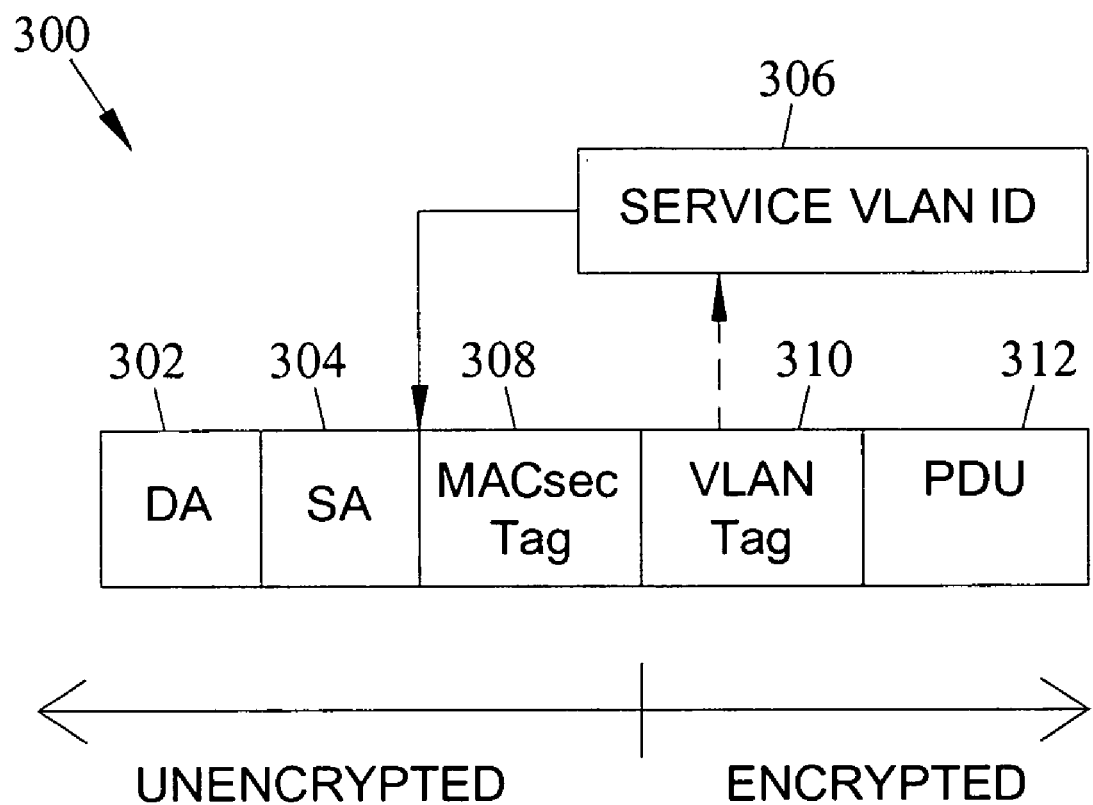
FIG. 3 is a block diagram illustrating exemplary fields in a layer 2 frame including a service VLAN identifier according to an embodiment of the subject matter described herein.

FIG. 3 is a block diagram illustrating a layer 2 frame including a service VLAN identifier according to an embodiment of the subject matter described herein. Referring to FIG. 3, layer 2 frame 300 includes a layer 2 destination address 302, a layer 2 source address 304, a service VLAN tag 306, and a layer 2 security indicator, referred to as a media access control security (MACsec) tag 308, located in an unencrypted portion of the message. In the encrypted portion of the layer 2 frame, the VLAN tag 308 is included. VLAN tag 310 may be an 802.1Q customer VLAN tag inserted by the sending network. It should also be noted that multiple customer VLAN tags may be inserted in the encrypted portion of the message without departing from the scope of the subject matter described herein. The remaining encrypted portion of the message includes protocol data unit (PDU) 310 that carries the payload portion of layer 2 frame 300.

Figure 4:
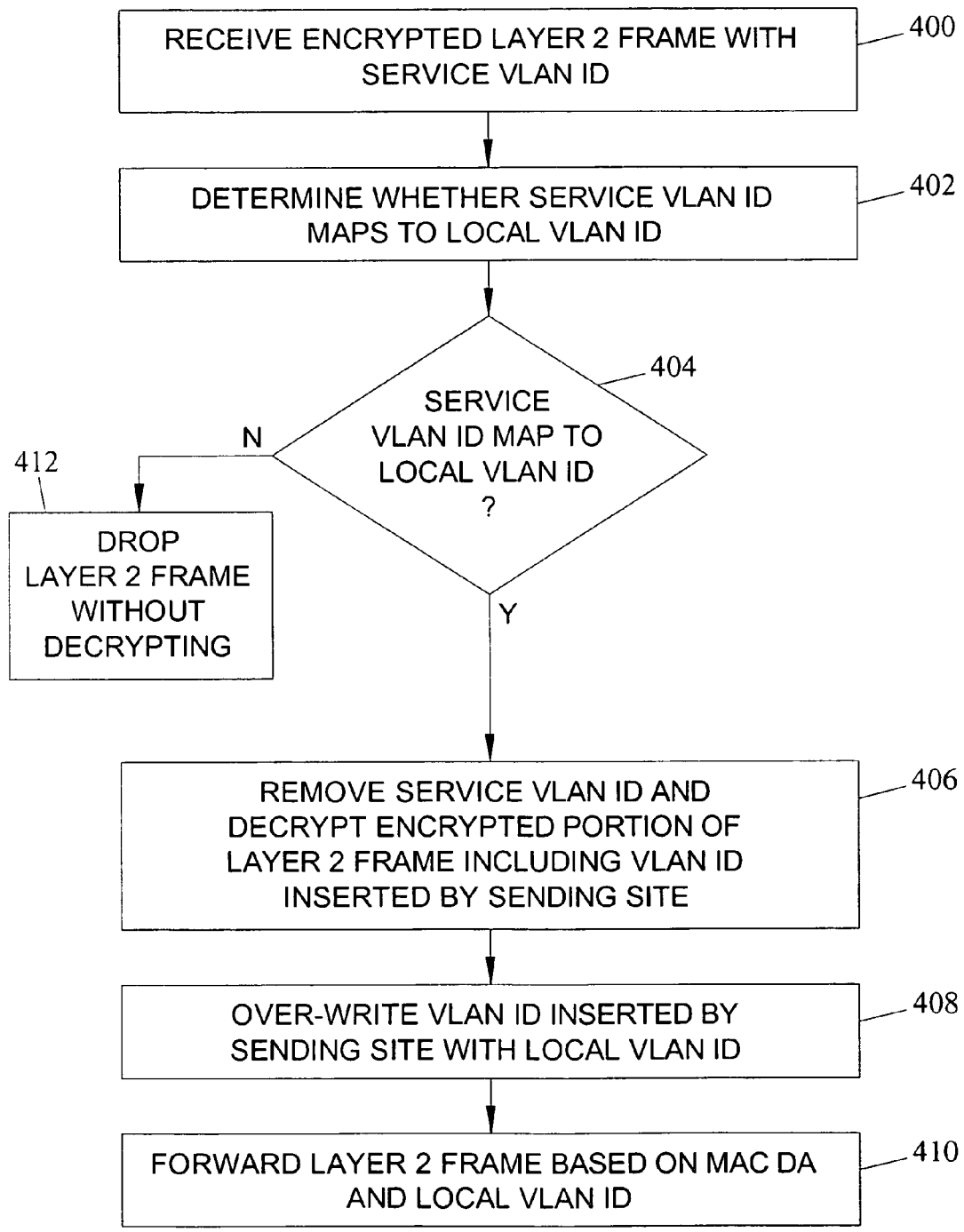
FIG. 4 is a flow chart illustrating an exemplary process for processing a received encrypted layer 2 frame with a service VLAN identifier according to an embodiment of the subject matter described herein.

FIG. 4 is a flow chart illustrating an exemplary process for processing an encrypted layer 2 frame with a service VLAN identifier according to an embodiment of the subject matter described herein. The steps illustrated in FIG. 4 may be performed at a layer 2 frame forwarding device located at the edge of a secure service VLAN and a receiving customer VLAN. The layer 2 frame forwarding device may be under the administrative domain of the service network or the customer network, if the service network and the customer network are under different administrative domains.

Referring to FIG. 4, in step 400, an encrypted layer 2 frame is received. The encrypted layer 2 frame may include a service VLAN identifier. In step 402, it is determined whether the service VLAN identifier maps to a local VLAN identifier, such as a customer VLAN identifier. In step 404, if it is determined that the service VLAN identifier maps to a local VLAN identifier, control proceeds to step 406 where the service VLAN identifier is removed, and the encrypted portion of the layer 2 frame is decrypted. The decrypted portion includes the VLAN identifier, e.g., the customer VLAN identifier, inserted by the sending site. In step 408, the VLAN identifier inserted by the sending site is replaced with the local VLAN identifier, such as the customer VLAN identifier that corresponds to the customer VLAN identifier inserted by the sending site. Step 408 may be omitted if the local VLAN identifier and the sending site VLAN identifier are the same. In step 410, the layer 2 frame is forwarded based on the MAC or layer 2 destination address and the local VLAN identifier. Step 410 may include performing a lookup in a layer 2 forwarding table based on the MAC destination address and the local VLAN identifier to determine an output port or ports to which the frame should be forwarded.

Returning to step 404, if the service VLAN identifier does not map to a local VLAN identifier, control proceeds to step 412 where the layer 2 frame is discarded without decrypting the encrypted portion of the layer 2 frame. Thus, using the service VLAN identifier to determine whether or not to perform the decryption operation eliminates unnecessary frame decryption at sites that were not intended to receive the frame.

According to another aspect of the subject matter described herein, a network device in a secure layer 2 broadcast transport network may discard layer 2 frames that are received unencrypted but have valid service VLAN IDs. This protects the customer network by preventing remote devices from compromising the secure customer network by spoofing the service VLAN ID from a non-secure site. On a per-service-VLAN basis, the service VLAN can enforce encryption or allow the traffic to be sent unencrypted. That is, the network device in the secure layer 2 broadcast network may be configured to allow unencrypted layer 2 frames with some service VLAN identifiers to pass while blocking unencrypted layer 2 frames with service VLAN identifiers corresponding to customer VLANs desiring secure transport.

In one exemplary implementation, a method for enforcing encryption on a per-service-VLAN basis may include receiving an unencrypted layer 2 frame having a service VLAN identifier and a customer VLAN identifier. It may then be determined whether the service VLAN identifier corresponds to a customer VLAN that requires encryption. In response to determining that the service VLAN identifier corresponds to a customer VLAN that requires encryption, the received layer 2 frame may be discarded. In response to determining that the service VLAN identifier corresponds to a customer VLAN that does not require encryption, the received layer 2 frame may be forwarded to its destination.

Figure 5:
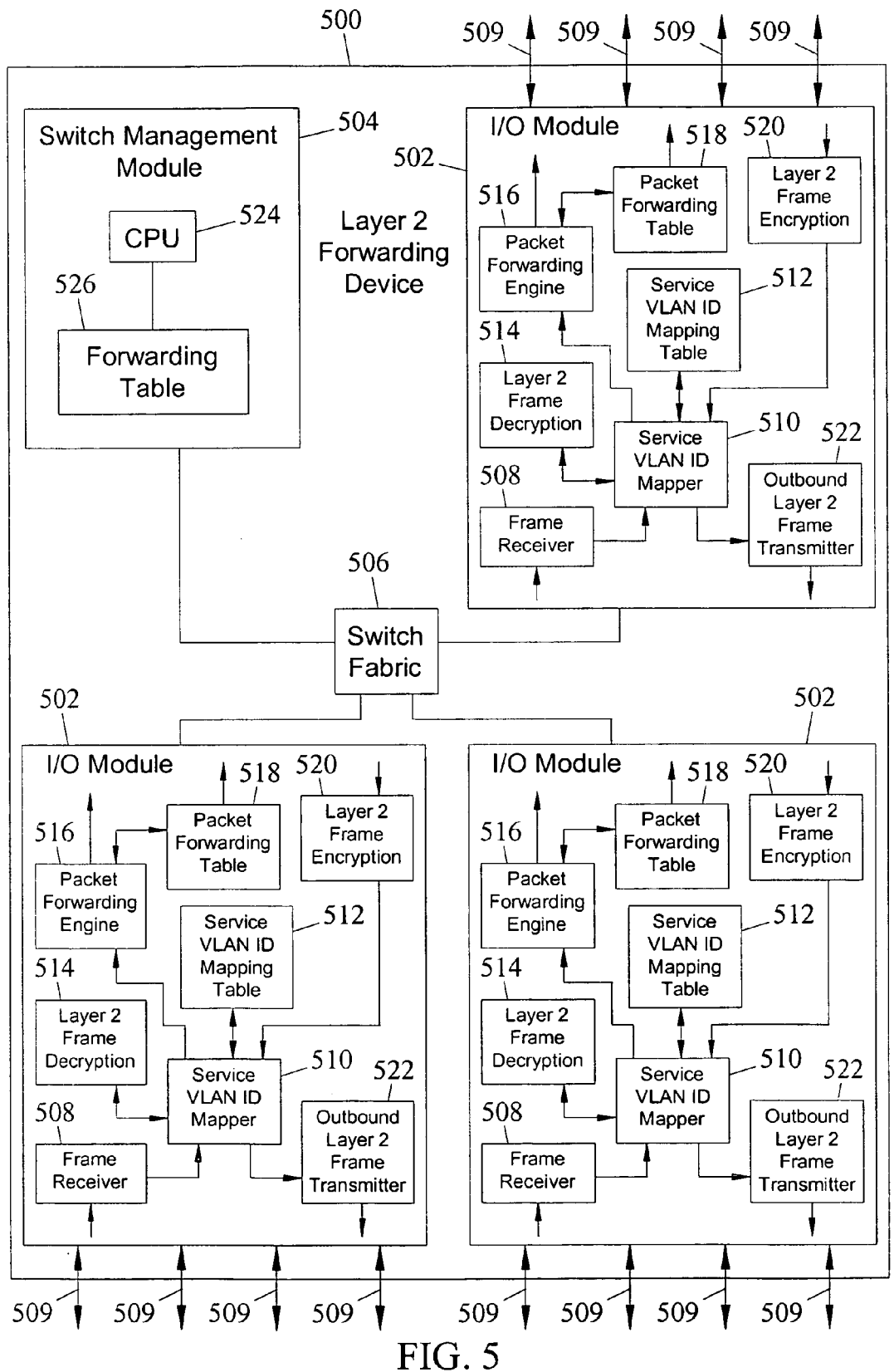
FIG. 5 is a block diagram of a layer 2 forwarding device capable of transmitting and receiving frames associated with different VLANs over a secure layer 2 broadcast transport network according to an embodiment of the subject matter described herein.

FIG. 5 is a block diagram of an exemplary layer 2 forwarding device including a system for transmitting and receiving layer 2 frames associated with different VLANs over a secure layer 2 broadcast transport network according to an embodiment of the subject matter described herein. Referring to FIG. 5, layer 2 forwarding device 500 may be any suitable layer 2 packet or frame forwarding device, such as an Ethernet switch or a router that includes an Ethernet switch. In the illustrated example, layer 2 forwarding device 500 includes a plurality of input/output (I/O) modules 502, a switch management module 504, and a switch fabric 506. Each I/O module 502 includes a frame receiver 508 for receiving layer 2 frames from input/output ports 509. A service VLAN ID mapper 510 examines entries in a service VLAN ID mapping table 512 to determine whether a service VLAN ID in a received frame corresponds to a local VLAN, such as a customer VLAN. If the service VLAN ID in a received frame corresponds to a local VLAN, service VLAN ID mapper 510 forwards the layer 2 frame to a layer 2 frame decryption module 514. Layer 2 frame decryption module 514 decrypts the encrypted portion of the frame, including the 802.1Q VLAN tag inserted by the customer VLAN. Service VLAN ID mapper 510 may then replace the decrypted customer VLAN identifier with the corresponding local customer VLAN identifier. Service VLAN ID mapper 510 may also remove the service VLAN identifier from the frame.

Once the local customer VLAN identifier has been inserted in the frame, service VLAN transport ID mapper 510 forwards the frame to packet forwarding engine 516 to locate the output ports to which the packets should be forwarded or flooded. Packet forwarding engine 516 performs a lookup in packet forwarding table 518 to make this determination. The packet is then forwarded to the I/O module associated with the appropriate output port or ports.

On the transmit side, each I/O module 502 includes a layer 2 frame encryption module 520 for receiving frames to be transmitted over the secure layer 2 broadcast transport network. Layer 2 frame encryption module 520 may implement any suitable layer 2 encryption algorithm, such as the encryption algorithm specified by the IEEE 802.ae standard. Service VLAN ID mapper 510 may map the customer VLAN identifier in the layer 2 frame to a service VLAN identifier. Service VLAN ID mapper 510 may perform this operation prior to encryption of the packet, simultaneously with encryption of the packet, or after encryption of the packet. Service VLAN ID mapper 510 may access service VLAN ID mapping table 512 to determine the service VLAN identifier that should be inserted in the packet. Table 1 shown below illustrates an example of a service VLAN ID mapping table that may be used by site A 100 illustrated in FIG. 1.

TABLE 1

Customer to Service VLAN ID Mappings for Site A

| Customer VLAN ID | Service VLAN ID |
|---|---|
| 1 | 2001 |
| 2 | 2002 |
| 3 | 2003 |
| 4 | 2004 |

In Table 1, it can be seen that the customer VLAN IDs 1-4 used by site A 100 map to service VLAN IDs 2001-2004. For packets being transmitted over the transport network, the switch or router at the edge of the transport network would insert the appropriate service VLAN identifier into unencrypted portions of the frames. For inbound packets, the switch or router would use the mappings in Table 1 to determine whether the service VLAN identifier corresponds to a local customer VLAN identifier. Sites B and C 102 and 104 would include similar mapping tables except that different customer and service VLAN identifiers would be included. For example, the site B service VLAN ID mapping table may be as follows:

TABLE 2

Customer to Service VLAN ID Mappings for Site B

| Customer VLAN ID | Service VLAN ID |
|---|---|
| 5 | 2005 |
| 6 | 2006 |
| 7 | 2007 |
| 8 | 2008 |

The site C service VLAN ID mapping table may be as follows:

TABLE 3

Customer to Service VLAN ID Mappings for Site C

| Customer VLAN ID | Service VLAN ID |
|---|---|
| 9 | 2009 |
| 10 | 2010 |
| 11 | 2011 |
| 12 | 2012 |

The service VLAN ID mapping table for headquarters site 106 illustrated in FIG. 1 may be as follows:

TABLE 4

Customer to Service VLAN ID Mappings for Headquarters Site

| Customer VLAN ID | Service VLAN ID |
|---|---|
| 1001 | 2001 |
| 1002 | 2002 |
| 1003 | 2003 |
| 1004 | 2004 |
| 1005 | 2005 |
| 1006 | 2006 |
| 1007 | 2007 |
| 1008 | 2008 |
| 1009 | 2009 |
| 1010 | 2010 |
| 1011 | 2011 |
| 1012 | 2012 |

In Table 4, it can be seen that the mapping table at the headquarters site includes a superset of the service VLAN identifiers used by all the other sites. In addition, the customer VLAN identifiers for the headquarters site are different from those used by the member sites. In an alternate example, these identifiers could be the same.

Returning to FIG. 5, once service VLAN ID mapper 510 maps the customer VLAN identifier in a frame to be transmitted over the transport network to a service VLAN identifier and inserts the service VLAN identifier in the layer 2 frame, the frame is forwarded to outbound layer 2 frame transmitter 522. Outbound layer 2 frame transmitter 522 transmits the frame over the secure layer 2 broadcast transport network.

Switch management module 504 illustrated in FIG. 5 performs management functions for layer 2 forwarding device 500, such as initial provisioning of layer 2 forwarding tables maintained by each I/O module. CPU 524 may also maintain a local copy 526 of the forwarding tables maintained by each I/O module. Switch fabric 506 forwards frames between I/O modules and switch management module 504.

It will be understood that various details of the invention may be changed without departing from the scope of the invention. Furthermore, the foregoing description is for the purpose of illustration only, and not for the purpose of limitation.

What is claimed is:

1. A method for transmitting a layer 2 frame over a secure layer 2 broadcast transport network, the method comprising:
   (a) receiving, at a transmit port of a layer 2 forwarding device, a layer 2 frame to be sent over a secure layer 2 broadcast transport network, the layer 2 frame including a first VLAN identifier used to identify a first VLAN;
   (b) mapping the first VLAN identifier to a second VLAN identifier used by the secure layer 2 broadcast transport network to identify the first VLAN and to limit the layer 2 broadcast domain of the layer 2 frame in the layer 2 broadcast transport network to the first VLAN;
   (c) encrypting a portion of the layer 2 frame including the first VLAN identifier and inserting the second VLAN identifier in an unencrypted portion of the layer 2 frame; and
   (d) transmitting the layer 2 frame over the secure layer 2 broadcast transport network.

2. The method of claim 1 wherein the secure layer 2 broadcast transport network comprises a service network, the sending site comprises a customer network, the first VLAN identifier comprises a customer VLAN tag inserted by the customer network, and the second VLAN identifier comprises a service VLAN identifier.

3. The method of claim 2 wherein the customer network and the service network are under a common administrative domain.

4. The method of claim 2 wherein the customer network and the service network are under different administrative domains.

5. The method of claim 1 wherein encrypting a portion of the layer 2 frame includes encrypting the portion of the layer 2 frame prior to the mapping of the first VLAN identifier to the second VLAN identifier.

6. The method of claim 1 wherein encrypting a portion of the layer 2 frame includes encrypting the portion of the layer 2 frame simultaneously with the mapping of the first VLAN identifier to the second VLAN identifier.

7. The method of claim 1 wherein encrypting a portion of the layer 2 frame includes encrypting the portion after the mapping of the first VLAN identifier to the second VLAN identifier.

8. The method of claim 1 wherein transmitting the layer 2 frame over the secure layer 2 broadcast transport network includes using the second VLAN identifier to restrict a broadcast domain of the layer 2 frame in the secure layer 2 broadcast transport network.

9. The method of claim 1 wherein transmitting the layer 2 frame over a secure layer 2 broadcast transport network includes transmitting the secure layer 2 frame over a metro Ethernet network.

10. The method of claim 1 comprising, at a receiving site, decrypting the layer 2 frame and forwarding the layer 2 to the first VLAN using the first VLAN identifier.

11. The method of claim 1 comprising, at a receiving site, decrypting the layer 2 frame, replacing the first VLAN identifier with a third VLAN identifier used by the receiving site to identify the first VLAN, and forwarding the layer 2 frame to nodes associated with the first VLAN.

12. The method of claim 11 wherein the first VLAN identifier corresponds to a first customer VLAN of a first customer network, wherein the receiving site comprises a second customer network, and wherein the third VLAN identifier corresponds to a second customer VLAN of the second customer network.

13. A system for transmitting frames associated with different VLANs over a secure layer 2 broadcast network, the system comprising:
  (a) a layer 2 frame encryption module for receiving a layer 2 frame to be transmitted over a secure layer 2 broadcast transport network and for encrypting a portion of the layer 2 frame including a first VLAN identifier associated with a first VLAN;
  (b) a service VLAN identifier mapper for mapping the first VLAN identifier to a second VLAN identifier used by the secure layer 2 broadcast transport network to identify the first VLAN and to limit the layer 2 broadcast domain of the first layer 2 frame in the layer 2 broadcast transport network to the first VLAN and for inserting the second VLAN identifier in an unencrypted portion of the layer 2 frame; and
  (c) an outbound layer 2 frame transmitter for transmitting the layer 2 frame over the secure layer 2 broadcast transport network.

14. The system of claim 13 wherein the secure layer 2 broadcast transport network comprises a service network, the sending site comprises a customer network, the first VLAN identifier comprises a customer VLAN tag inserted by the customer network, and the second VLAN identifier comprises a service VLAN identifier.

15. The system of claim 14 wherein the customer network and the service network are under a common administrative domain.

16. The system of claim 14 wherein the customer network and the service network are under different administrative domains.

17. The system of claim 13 wherein the layer 2 frame encryption module is adapted to encrypt the portion of the layer 2 frame prior to the mapping of the first VLAN identifier to the second VLAN identifier.

18. The system of claim 13 wherein the layer 2 frame encryption module is adapted to encrypt the portion of the layer 2 frame simultaneously with the mapping of the first VLAN identifier to the second VLAN identifier.

19. The system of claim 13 wherein the layer 2 frame encryption module is adapted to encrypt the portion of the layer 2 frame after the service VLAN transport identifier mapper maps the first VLAN identifier to the second VLAN identifier.

20. The system of claim 13 wherein the outbound layer 2 frame transmitter is adapted to transmit the layer 2 frame over a metro Ethernet.

21. A computer program product comprising computer-executable instructions embodied in a non-transitory computer-readable medium for performing steps comprising:
  (a) receiving, at a transmit port of a layer 2 forwarding device, a layer 2 frame to be sent over a secure layer 2 broadcast network, the layer 2 frame including a first VLAN identifier used to identify a first VLAN;
  (b) mapping the first VLAN identifier to a second VLAN identifier used by the secure layer 2 broadcast transport network to identify the first VLAN and to limit the layer 2 broadcast domain of the layer 2 frame in the layer 2 broadcast network to the first VLAN;
  (c) encrypting a portion of the layer 2 frame and inserting the second VLAN identifier in an unencrypted portion of the layer 2 frame; and
  (d) transmitting the layer 2 frame over the secure layer 2 broadcast transport network.

* * * * *